United States Patent
Chasen

(10) Patent No.: US 6,628,829 B1
(45) Date of Patent: Sep. 30, 2003

(54) METHOD AND SYSTEM FOR MATCHING A SURFACE COLOR

(76) Inventor: Richard Jeffrey Chasen, 308 Oak La., Richmond, VA (US) 23226

( * ) Notice: Subject to any disclaimer, the term of this patent is extended or adjusted under 35 U.S.C. 154(b) by 352 days.

(21) Appl. No.: 09/633,933

(22) Filed: Aug. 8, 2000

(51) Int. Cl.⁷ ................................................. G06K 9/00

(52) U.S. Cl. .................... 382/167; 382/305; 382/165

(58) Field of Search ........................... 382/165, 162, 382/167, 100, 305, 274; 358/504, 518, 520; 702/104, 32; 707/1–6, 140.1; 705/500; 356/402–425; 355/40; 433/29, 26, 215; 345/600, 595, 603; 700/224–226

(56) References Cited

U.S. PATENT DOCUMENTS

| | | | | |
|---|---|---|---|---|
| 4,492,474 A | | 1/1985 | Miller ......................... | 356/404 |
| 4,813,000 A | | 3/1989 | Wyman et al. .............. | 382/165 |
| 4,931,929 A | | 6/1990 | Sherman ...................... | 705/500 |
| 5,177,694 A | * | 1/1993 | Graham et al. ............. | 382/165 |
| 5,268,849 A | | 12/1993 | Howlett et al. ............. | 700/226 |
| 5,696,539 A | | 12/1997 | Welti et al. .................. | 345/603 |
| 5,720,017 A | | 2/1998 | Cheetam et al. ............ | 345/595 |
| 5,798,943 A | | 8/1998 | Cook et al. .................. | 382/162 |
| 5,864,387 A | | 1/1999 | Reed et al. .................... | 355/40 |
| 5,949,904 A | | 9/1999 | Delp ............................ | 382/165 |
| 5,973,801 A | | 10/1999 | Bresler ........................ | 358/520 |
| 6,007,332 A | * | 12/1999 | O'Brien ....................... | 433/26 |
| 6,014,221 A | | 1/2000 | Plude, Jr. .................... | 356/402 |
| 6,043,894 A | | 3/2000 | Van Aken et al. .......... | 356/425 |
| 6,046,723 A | | 4/2000 | Daniels et al. .............. | 345/600 |
| 6,058,357 A | | 5/2000 | Granger ...................... | 702/104 |

OTHER PUBLICATIONS

Slater et al., The Illumination–Invariant Recognition of 3D Objects Using Local Color Invariants, *IEEE Transactions on Pattern Analysis and Machine Intelligence*, vol. 18, No. 2, pp. 206–210, Feb. 1996.

"Poynton's Color FAQ" pp. 1–25 from web site http://www.inforamp.nte/~poynton/notes/colour_and_gamma/ColorFAQ. Html dated Sep. 26, 2000. Copyright Feb. 27, 1997(f).

A Short Course in Digital Photography, Chapter 2 "The Foundations of Digital Imaging" pp. 1–21 from web site: htp://www.shortcourse.com/book01/chapter02.htm#Image Sensors and Colors dated Jul. 30, 2000.

A Short Course in Digital Photography, Chapter 3 "So you Have to Know Arithmetic After All" pp. 1–11 from web site http://www.shortcourses.com/book01/chapter02.htm dated Sep. 26, 2000.

"How Many Colors are there?" pp. 1–3 from web site: http://www.upenn.edu/computing/group/dmp/technical/colors/how_many.html dated Sep. 26, 2000.

ColorTec Index pp. 1–2 from web site http://www.color-tec.com/color/Index.htm dated Sep. 6, 2000.

Fundamentals of Industrial Color Technology pp. 1–2 from web site: http://www.color-tec.com/color/intro.htm dated Sep. 26, 2000. Copyright 1998,1999 Color Tec Associates, Inc.

(List continued on next page.)

*Primary Examiner*—Leo Boudreau
*Assistant Examiner*—Ishrat Sherali
(74) *Attorney, Agent, or Firm*—Hunton & Williams

(57) ABSTRACT

A method for matching a color of a target surface involves capturing a digital image of the target surface and a test card having a pattern of color fields, each color field having a known true color. The digital image is analyzed to determine the captured target color and the captured colors of the of the test card color fields. A correction model accounting for ambient lighting conditions and distortions due to the image capturing device is computed from the captured and known colors of the test card color fields. The correction model is applied to the captured target color and the resulting estimated true target color is compared to a database of true product colors to determine a nearest matching product color.

35 Claims, 4 Drawing Sheets

OTHER PUBLICATIONS

"What is Color?" p. 1 from web site http://www.color-tec.com/color/color.htm dated Sep. 26, 2000. Copyright 1998, 1999 Color Tec Associates, Inc.

"What is a Color Computer?" pp. 1–2 from web site http://www.color-tec.com/color/wicc.htm. dated Sep. 26, 2000. Copyright 1998,1999 Color Tec Associates, Inc.

"Color Is The Physics Of Light" p. 1 from web site http://www.color-tec.com/color/p3.htm dated Sep. 26, 2000. Copyright 1998,1999 Color Tec Associates, Inc.

"Lighting and Illuminants" pp. 1–2 from web site http://www.color-tec.com/color/p5.htm dated Sep. 26, 2000. Copyright 1998,1999 Color Tec Associates, Inc.

"Color Is Human Vision" pp. 1–2 from web site http://www.color-tec.com/color/p7.htm dated Sep. 26, 2000. Copyright 1998,1999 Color Tec Associates, Inc.

"How Do We Program A Color Computer With The Human Vision Response?" p. 1 from web site http://www.color-tec.com/color/color/p8.htm. Copyright 1998,1999 Color Tec Associates, Inc.

"How Color Computers Compute How A Color Looks" p. 1 from web site http://www.color-tec/color/p9.htm dated Sep. 26, 2000. Copyright 1998,1999 Color Tec Associates, Inc.

"Color Is Human Judgment" p. 1 from web site http://www.color-tec.com/color/p10.htm dated Sep. 26, 2000. Copyright 1998,1999 Color Tec Associates, Inc.

"The Mathematics Of Color Difference" pp. 1–3 from web site http://www.color-rec.com/color/p11.htm. Copyright 1998,1999 Color Tec Associates, Inc.

"Color Is The Physics And Chemistry Of Materials" pp. 1–2 from web site http://www.color-tec.com/color/p12.htm. Copyright 1998,1999 Color Tec Associates, Inc.

"Colorants" p. 1 from web site http://www.color-tec.com/color/p13.htm dated Sep. 26, 2000. Copyright 1998,1999 Color Tec Associates, Inc.

"Color Mixing" p. 1 from web site http://www.color-tec.com/color/cm.htm dated Sep. 26, 2000. Copyright 1998, 1999 Color Tec Associates, Inc.

"Coloring A Paint, Ink Or Plastic" pp. 1–2 from web site http://www.color-tec.com/color/p14.htm dated Sep. 26, 2000. Copyright 1998,1999 Color Tec Associates, Inc.

"Making Colored Materials" p. 1 from web site http://www.color-tec.com/color/p15.htm dated Sep. 26, 2000. Copyright 1998,1999 Color Tec Associates, Inc.

"Color Computer Color Database" p. 1–2 from web site http://www.color-tec.com/color/p16.htm dated Sep 26, 2000. Copyright 1998,1999 Color Tec Associates, Inc.

"Special Effects Colorants" p. 1 from web site http://www.color-tec.com/color/p17.htm dated Sep. 26, 2000. Copyright 1998,1999 Color Tec Associates, Inc.

"Color Computers—How Do They Work?" p. 1 from web site http://www.color-tec.com/color/p18.htm dated Sep. 26, 2000. Copyright 1998,1999 Color Tec Associates, Inc.

"Color Analyzer Instrument Designs" p. 1 from web site http://www.color-tec.com/color/p19.htm dated Sep. 26, 2000. Copyright 1998,1999 Color Tec Associates, Inc.

"Transmission Instruments" p. 1 from web site http://www.color-tec.com/color/p20.htm dated Sep. 26, 2000. Copyright 1998,1999 Color Tec Associates, Inc.

"45–Degree Instruments" p. 1 from web site http://www.color-tec.com/color/p21.htm dates Sep. 26, 2000. Copyright 1998,1999 Color Tec Associates, Inc.

"Sphere Color Instruments" p. 1 from web site http://www.color-tec.com/color/p23.htm dated Sep. 26, 2000. Copyright 1998,1999 Color Tec Associates, Inc.

"How Do You Use A Color Computer?" pp. 1–5 from web site http://www.color-tec.com/color/p24.htm dated Sep. 26, 2000. Copyright 1998,1999 Color Tec Associates, Inc.

Color Tec "Glossary of Color Terms" pp. 1–17 from web site http://www.color-tec.copm/1gloss.htm dated Sep. 26, 2000.

Datacolor International—Home Page web site "The Right Color—from Mind to Market". p. 1; Serivices pp. 1–4. Copyright 2000 Datacolor International.

Article dated Dec. 22, 1997 by Robert Lemos "Standard shows its ture colors" from ZDNet web site. pp. 1–2.

Color Matching—AOL Computing's Webopaedia Definition and Links pp. 1–2. Copyright 1996–2000 internet. com Corporation.

CIE Color Model—AOL Computing's Webopaedia Definition and Links pp. 1–2 Copyright 1996–2000 internet.com Corporation.

RGB monitor—AOL Computing's Webopaedia Definition and Links p. 1. Copyright 1996–2000 internet.com Corporation.

Color monitor—AOL Computing's Wegopaedia Definition and Links pp. 1–2. Copyright 1996–2000 internet.com Corporation.

True Internet Color—Overview—in True Internet Color p. 1. Copyright E–Color, Incorporated, 2000. Web site http://www.ecolor.com/01/01_01.html.

True Internet Color—How it works—in True Internet Color p. 1. Copyright E–Color, Incorporated, 2000. Web site http://www.ecolor.com/01/01_20html.

True Internet Color—Web Developers—in Ture Internet Color p. 1. Copyright E–Color, Incorporated, 2000. Web site http://www.ecolor.com/01/01_04s.html.

TRUMATCH Home Page, pp. 2. TruMatch The Digital Difference. Copyright 1997, TRUMATCH, Inc.

TruMatch The Digital Difference, Articles about color, p. 1. Copyright 1997, TRUMATCH, Inc. Web site http://www.trumatch.com/articles.htm.

Article "Process Color and the Computer", pp. 1–4. Copyright 1995–1997, TRUMATCH, Inc. Web site http://www.trumatch.com/articles/10things.htm.

Article "Sampling the Color Matching Spectrum", pp. 1–4, Copyright 1995–1997, TRUMATCH, Inc. Web site http://www.trumatch.com/articles/truwhite.htm.

Article "Preventing 4–color matching problems in the digital world", pp. 1–3. Copyright 1995–1997, TRUMATCH, Inc. Web site http://www.trumatch.com/articles/tru–pp.htm.

Article "The Digital Specification of 4–Color", pp. 1–2. Copyright 1995–1997, TRUMATCH, Inc. Web site http://www.trumatch.com/articles/tu–cpub.htm.

Article "The Match Game", pp. 1–3. Copyright 1995–1997, TRUMATCH, Inc. Web site http://www.trumatch.com/articles/tu–mdp.htm.

Article "Screening Spot Color", pp. 1–3. Copyright 1995–1997, TRUMATCH, Inc. Web site http://www.trumatch.com/articles/t–edpub.htm.

Article "Anchoring Color Space" p. 1. Copyright 1995–1997, TRUMATCH, Inc. Web site http://www.trumatch.com/articles/anchor.htm.

Article "'Avon–Calling', with Digitally Producted, Precision–Color–Controlled Catalogs", pp. 1–3. Copyright 1995–1997, TRUMATCH, Inc. Web site http://www.trumatch.com/articles/tru–avon.htm.

Article "Frequently Asked Questions about TRUMATCH", pp. 1–3. Copyright 1995–1997, TRUMATCH, Inc. Web site http://www.trumatch.com/articles/qa.htm.

Article "New TRUMATCH Swatch Printer Software 2.0 for Windows allows exact color matching to any desktop printer", pp. 1–4. Copyright 1995–1997, TRUMATCH, Inc. Web site http://www.trumatch.com/articlestru–sps2.htm.

Article "Match Head color matching utility" by Daniel Lewis for Alhena Design, p. 1, and copy of mainscreen from Web site http://www.alhena–desing.com/matchhead/starring.html.

ColorEng Inc. Home Page plus Article on "Color Tools" which include color calculator, RGB converter and L*a*b* converter pp. 6. Copyright 1998–2000, ColorEng Inc.

Color Master, Inc. "Color is our Business", p. 1 Color Master index.htm.

Software Italtinto Solfware Tools, pp. 1–2. Web site http://www.italtinto.com/software.htm.

Article "Color Appearance Models" by Mark D. Fairchild, pp. 1–4, dated Jul. 27, 2000. Web site http://www.cis.rit.edu/people/faculty/fairchild/CAM.html.

Windows 95 Image Color Matching, p. 1. Copyright 2000 Microsoft Corporation. Web site http://msdn.com/library.d-dkdoc/win95ddk/icm_1os3.htm.

CIELAB & color wheels, pp. 1–16. Copyright 200o handprint media. Web site http://www.handprint.com/HP/WCL/color6.html#LAB1.

* cited by examiner

METHOD AND SYSTEM FOR MATCHING A SURFACE COLOR

BACKGROUND OF THE INVENTION

The present invention relates broadly to the matching of a target surface color and more particularly to automated analysis of a digital image of the target color to produce a closest match from a known color database.

The matching of a target color is highly important in a wide variety of industries, but particularly in industries requiring the matching of new paint to previously painted surfaces. The perceived color of a previously painted surface is dependent on the nature of the surface, the nature of the old paint and the pigments included therein, the lighting conditions under which the surface is observed and the limitations of the perceiving person or device. As a consequence, results can be highly variable.

Under controlled conditions, highly accurate spectrographic equipment can be used to determine spectral characteristics of a target surface color. These characteristics can be used to select a coating or paint that under similarly controlled conditions will produce a color having substantially the same spectral characteristics. However, in most instances, the use of such equipment and controlled conditions in the field (e.g., to obtain color data on a construction site or in an automotive body shop) is likely to be impracticable or prohibitively expensive. Moreover, there is no guarantee that the color that matches the target color under controlled lighting conditions will match the color under typical ambient lighting conditions.

One alternative method of matching a target surface color in the field is to place each of a series of color sample cards adjacent the surface and select what appears to be the nearest matching color. This method has the virtues of simplicity, portability and relatively low cost. However, it suffers from several sources of error including the perception of the person making the comparisons, the limited number of colors that may be compared, variance between the colors of the sample cards and the actual paint colors and variance between sample cards produced at different times by different methods.

Another method involves the hand matching of the color using actual paints. Though potentially accurate, this is obviously a highly time-consuming and expensive approach. Also, this method still requires a subjective determination of a match and is thus subject to the limitations of the perception of the person implementing the method.

There is accordingly a need for a practical, inexpensive, yet accurate method for matching a target color that does not require highly specialized equipment or controlled lighting conditions.

SUMMARY OF THE INVENTION

It is therefore an objective of the present invention to provide an accurate method of matching a target color under typical ambient lighting conditions.

It is another objective of the present invention to provide a method of matching a target color that includes capturing a digital image of the target color and using an automated process to model and adjust for the effects of ambient lighting conditions and distortions introduced by the equipment used to produce the image.

It is still another object of the present invention to provide a system for matching a target color including a data processing system having software for analysis of a digital image of the target surface and a specially configured test card that may be purchased by the user.

It is also an objective of the present invention to provide a method of providing an automated color-matching service wherein a user can purchase one or more uses of the service.

Toward these ends, a method for matching a color of a target surface comprises providing a test card having a pattern of at least one color field printed thereon. Each of the at least one color field is substantially monochromatic and has a true color. The method further comprises positioning the test card adjacent the target surface. A digital record is then produced that includes a digital image of the test card and at least a portion of the target surface exhibiting the target surface color. The target surface color produces a captured target color on the digital image and each of the at least one color field produces a captured pattern color on the digital image. An estimated true target color is determined using the captured pattern color and the true color of each of the at least one color field. The method also comprises providing a database of product color information. A nearest matching product color is determined using the estimated true target color and the database of product color information.

Determining an estimated true target color in a method for matching a color of a target surface according to the present invention may include determining a set of captured pattern color components for the captured pattern color of each of the at least one color field. The step may further include building a correction model having a set of empirical equations derived from the true color and the set of captured pattern color components of each of the at least one color field. A set of captured target color components for the captured target color may be determined and the correction model applied to the captured target color components to obtain the estimated true target color.

The step of determining an estimated true target color of a method for matching a color of a target surface according to the present invention may include determining the location and orientation within the digital record of the digital image of the test card and the at least a portion of the target surface exhibiting the target surface color. The step may further include locating within the digital image the captured pattern color of each of the at least one color field and the captured target color.

A method for matching a color of a target surface according to the present invention may further include the step of loading the digital record into a data processing system. In this embodiment, the step of determining an estimated true target color is accomplished by the data processing system. The data processing system may include a central data processor operatively connected to a data entry processor. In such an embodiment, the step of loading the digital record into the data processing system includes loading the digital record into the data entry processor and transferring the digital record to the central data processor. The central data processor and the data entry processor may be connected through a network. The central data processor and the data entry processor may be connected through the Internet.

The test card provided in a method for matching a color of a target surface according to the present invention may include an identification code printed thereon. The method may further comprise obtaining spectral data for each of the at least one color field of the test card under lighting conditions configured to establish the true color of the at least one color field. A set of true color components of the at least one color field is derived from the spectral data and stored in association with the identification code of the test card. This allows the set of true color components to be selectively retrieved. The step of determining an estimated true target color may then include retrieving the set of true color components of each of the at least one color field for use in constructing the correction model.

The test card used in a method for matching a color of a target surface according to the present invention may be one of a batch of test cards, the test card including an identification code printed thereon. The method may further comprise obtaining from a sample subset of the batch of test cards spectral data for each of the at least one color field of the test card under lighting conditions configured to establish the true color of the at least one color field. A representative set of true color components of each of the at least one color field is derived for the test card from the spectral data of the at least one color field of each of the sample subset of the batch of test cards. The representative set of true color components is stored in association with the identification code of the test card. This allows the selective retrieval of the representative set of true color components. The step of determining an estimated true target color may then include retrieving the representative set of true color components of each of the at least one color field for use in constructing the correction model.

The test card used in the method for matching a color of a target surface according to the present invention may include a gray scale having at least one gray field, each of the at least one gray field having a known relative brightness. Each of the at least one gray field produces an associated captured gray field on the digital image of the test card and the at least a portion of the target surface. The method may then further comprise determining an overall brightness of the digital image from the known relative brightness and captured brightness for each captured gray field. The method may then further comprise determining whether the overall brightness is within a set of predetermined brightness limits.

The test card used in the method for matching a color of a target surface according to the present invention may include a gloss black field that produces an associated captured gloss black field on the digital image of the test card and the at least a portion of the target surface. The method may then further comprise determining a gloss black brightness level for the captured gloss black color field. A glare level based on the gloss black brightness level may then be determined. The method may then further comprise determining whether the glare level is within a set of predetermined glare limits.

The database of product color information provided for use in a method for matching a color of a target surface according to the present invention may include a compilation of true product colors. The step of determining a nearest matching product color may then include comparing the estimated true target color to at least a portion of the compilation of true product colors. The nearest matching product color may be selected from the at least a portion of the true product colors. The database of product color information may alternatively include a product color formula whereby formulation for a colorant product can be determined for a given true color. The step of determining a nearest matching product color then may include calculating a target color colorant formulation using the product color formula and using the estimated true target color as the given true color. The target color colorant formulation is usable to provide the nearest matching product color.

An illustrative method for matching a color of a target surface according to the present invention comprises providing a test card having a pattern of at least one color field printed thereon. Each of the at least one color field is substantially monochromatic and has a true color. The test card is positioned adjacent the target surface and a digital record is produced that includes a digital image of the test card and at least a portion of the target surface exhibiting the target surface color. The target surface color produces a captured target color on the digital image and each of the at least one color field produces a captured pattern color on the digital image. The illustrative method also comprises providing a data processing system including a user processor operatively connected to a central processor, the central processor having analysis software for analyzing the digital record. The method further comprises the steps of downloading the digital record into the user processor, transferring the digital record to the central processor, and determining an estimated true target color using the central processor and the analysis software. The estimated true target color is then compared with known true product colors to identify products whose true color matches the estimated true target color within a predetermined set of matching criteria. The method also comprises the steps of transmitting information relating to matching color products to the user processor and outputting the information relating to matching color products.

The step of determining an estimated true target color in the above illustrative method may include determining the location and orientation within the digital record of the digital image of the test card and the at least a portion of the target surface exhibiting the target surface color. The step may also include locating within the digital image the captured pattern color of each of the at least one color field and the captured target color. A set of captured pattern color components can be determined for the captured pattern color of each of the at least one color field. The step of determining an estimated true target color may yet further include building a correction model having a set of empirical equations derived from the true color and the set of captured pattern color components of each of the at least one color field. A set of captured target color components can be determined for the captured target color. The correction model can be applied to the captured target color components to obtain the estimated true target color. The steps of determining an estimate true target color, comparing the estimated true target color, transmitting information and outputting the information of a method for matching a color of a target surface according to the present invention may be provided as a service to a user who has purchased the test card, wherein the purchase of the test card entities the user to a predetermined number of uses of the service. The method may further include the step of determining a number of authorized service uses associated with the test card. The service may be terminated and an error message returned to the user processor if the number of authorized service uses is not greater than zero.

A method for operating a service for matching a color of a target surface according to the present invention comprises providing a customer with a test card for use in capturing a digital image of at least a portion of the target surface and a pattern of at least one color field. The test card has the pattern of at least one color field and an identification code printed thereon. The method further comprises providing a data processing system including a central processor having installed therein analysis software, true color information for each of the at least one color field of the test card, and a product color database all for determining a product associated with a nearest matching color to the target surface color. A number of available test card service uses is stored in the data processing system in association with the identification code of the test card. The number of available test card service uses is increased responsive to receiving a payment from the customer. The method further comprises the steps of loading a digital record including the digital image into the data processing system and retrieving the number of available uses associated with the test card. Responsive to a determination that the number of available uses associated with the test card is greater than zero, the number of available uses of the test card is decreased by one, the product associated with a nearest matching color to the target color surface is determined and information regarding the product associated with the nearest matching color to the target surface color is provided to the customer.

A system for matching a color of a target surface using a digital imaging device comprises a thin, generally planar test card for placement adjacent the target surface. The test card has an upper surface with a pattern of at least one color field printed thereon. Each of the at least one color field is substantially monochromatic and has a true color. The test card is configured so that a digital record of the test card and at least a portion of the target surface exhibiting the target surface color may be obtained using the digital imaging device. The digital record would include a digital image of the test card and the target surface color, the target surface color producing a captured target color on the digital image and each of the at least one color field producing a captured pattern color on the digital image. The system further comprises a data processing system having means for receiving the digital record and software installed in the data processing system. The software is configured for analysis of the digital record and determination of an estimated true target color by application of a correction model to the captured target color. The correction model is determinable from the true color and the captured pattern color of each of the at least one color field. The system also comprises a color product database accessible by the data processing system. The color product database includes information from which a nearest matching product color to the estimated true target color may be determined.

The data processing system of a system for matching a target color according to the present invention may include a data entry processor operatively connected to a central processor, the software and the color product database being installed in the central processor. The data entry processor and the central processor may be connected through a network. The data entry processor and the central processor may be connected through the Internet.

The test card of a system for matching a target color according to the present invention may include an identification code printed thereon. Further, the test card may be one of a plurality of test cards, each of the plurality of test cards having a unique identification code. The system may further comprise a database of true color components of the at least one color field for each of the plurality of test cards. The database of true color components is searchable by the identification code. This makes the true color components of the at least one color field of a selected one of the plurality of test cards accessible to the software.

The test card of a system for matching a color of a target surface according to the present invention may have an aperture formed there through whereby the target surface color may be made visible through the aperture when the test card is placed adjacent the target surface.

The upper surface of the test card of a system for matching a color of a target surface according to the present invention may have a gray scale printed thereon. The gray scale includes at least one gray field. Each of the at least one gray field has a different relative brightness value. The gray scale is configured to produce in the digital image a corresponding captured gray scale from which an overall brightness of the digital image can be ascertained. The upper surface of the test card may have a gloss black field printed thereon. The gloss black field is configured to produce in the digital image a corresponding captured gloss black field, from which a relative glare amount can be ascertained for the digital image.

A color test card for use in a system for matching a color of a target surface according to the present invention may be configured so that a digital record of the test card and at least a portion of the target surface exhibiting the target surface color may be obtained using a digital imaging device. The digital record includes a digital image of the test card and the target surface color, the target surface color producing a captured target color on the digital image and each of the at least one color field producing a captured pattern color on the digital image. The color test card may have a predetermined shape configured to facilitate automated location of the digital image of the test card and the target surface color in the digital record using object recognition software.

By the above, the present invention provides a convenient color matching method that allows a user to obtain highly accurate results without requiring a large investment in equipment or software.

DESCRIPTION OF THE PREFERRED EMBODIMENTS

Current methods of matching colors have significant accuracy problems, primarily due to one of two factors: 1) the subjective nature of matches accomplished by an individual through visual comparison of the target color to sample colors; or 2) the failure to account for ambient light distortions in objective models based on spectral data obtained under controlled lighting conditions. The present invention overcomes these problems through the application of relatively recently developed digital image technology.

Figure 1:
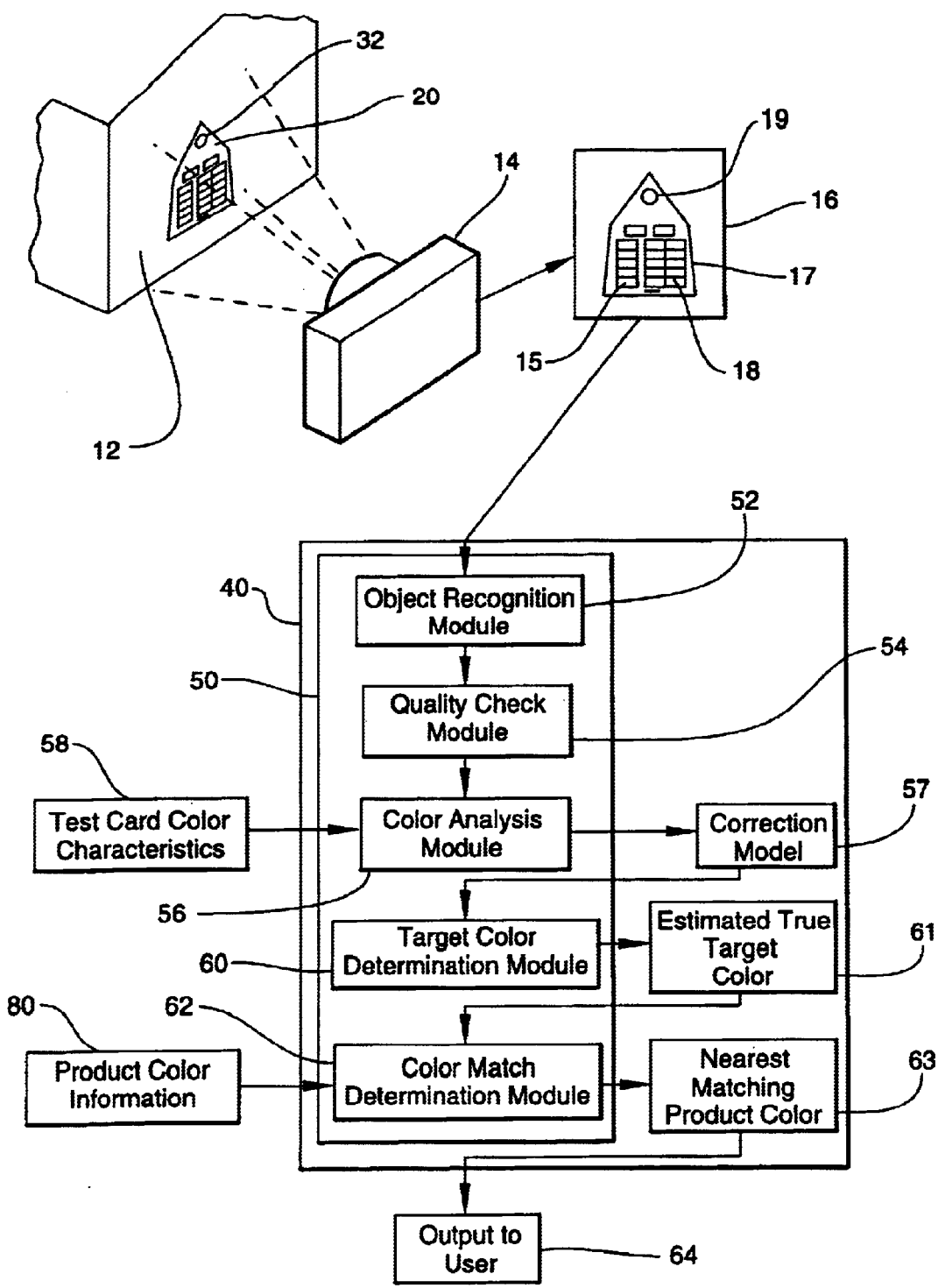
FIG. 1 is a flow diagram illustrating a method of color-matching according to one embodiment of the present invention.

Referring to the accompanying drawings and more particularly to FIG. 1, a method of matching the color of a target surface 12 involves the placement of a test card 20 adjacent the target surface 12 and capturing a digital image 16 of the target surface 12 and the test card 20 using a digital camera 14 or other digital imaging device. The digital image 16 is preferably obtained under lighting conditions that are typical of the conditions under which the target surface 12 is generally viewed. As will be discussed in more detail hereafter, the test card 20 includes an array or pattern of test color fields having known spectral characteristics under controlled lighting conditions and which can be used to assess the effects of the ambient lighting conditions and the distortions caused by the imaging device used. The test card 20 also has an aperture 32 through which the target surface 12 is visible. After capture, the digital image 16 is downloaded to a data processing system (illustrated schematically at 40) for analysis. The data processing system 40 uses specialized software 50 that will be discussed in more detail below. The software 50 includes an object recognition module 52 for recognizing the test card portion 17 of the digital image 16 and identifying color areas for analysis. A quality check module 54 assures that the digital image 16 meets certain requirements as to brightness, glare and resolution. A color analysis module 56 then produces a correction model 57 based on differences between the captured test card colors 18 and the true test card color characteristics 58 obtained under standard controlled lighting conditions. A target color determination module 60 then applies the correction model to the captured target color 19 to determine an estimate 61 of the true color of the target surface 12. The estimated true target color 61 is essentially an approximation of the color characteristics that would be obtained for the target surface 12 under controlled lighting conditions. A color match module 62 then uses the estimated true target color 61 and product color information 80 to determine a nearest matching product color 63. The product color information 80 is derived from true product color data obtained under controlled lighting conditions. Information regarding the nearest matching color product 63 is then provided as output 64 to the user.

The significance of the nearest matching product color 63 is that it will match, not only the true color of the target surface 12 as it would appear under controlled conditions, but the apparent color of the target surface 12 under the ambient lighting conditions in which the digital image 16 was captured.

The present invention takes advantage of technology advances in the areas of digital imaging and automated analysis of digital image data. In general, a digital image is produced using an image sensor that records the intensity or brightness of light tailing on thousands of photosites on a silicon chip, The brightness recorded at each photosite is stored as data that can be used to construct the thousands of pixels that make up a digital image. Color information for each pixel is obtained by separating out the primary color components of the light reflected by an object. This is accomplished by separately recording the brightness data of the reflected light after it has been filtered by each of three primary colors. Most imaging systems use an additive (red-green-blue or RGB) primary color system wherein brightness data is obtained for light that has been passed through red, green and blue filters. The examples discussed throughout this section will involve the use of RGB color data. It will be understood by those having ordinary skill in the art that data based on a subtractive (cyan-magenta-yellow or CMY) color system or data presented in any other three component (or four component) color system could be used in practicing the method of the present invention.

The filtered brightness data is used to establish color data for each pixel of the digital image. This color data is stored using 8, 16 or 24 bits of memory for each pixel. In general, 16 bits are required as a minimum in order to provide sufficient color resolution for color matching and the use of 24 bits is preferred.

If the captured color of a particular region within a digital image is of interest, mean color values for the region can be obtained by retrieving the color values for each of the pixels within the region and averaging them. In general, this captured color will differ from the true color of the surface. As used herein, the term "true color" refers to color information obtained under standard, controlled conditions using industry standard spectrographic equipment. Differences between the captured color and the true color result from a variety of effects such as the ambient lighting conditions and the quality and condition of the camera lens.

According to the method of the present invention, the differences between captured and true color values for a set of predetermined colors can be used to construct a correction model 57 that can be applied to a captured target color 19 in order to obtain an estimated true target color 61. Because the shifts in color due to light distortion effects tend to vary from color to color in a non-linear fashion, the correction model 57 should include a set of non-linear, multi-dimensional equations. Such a model can be constructed from an image 16 that includes the target color 19 and a set of test colors 18 for which true color data 58 is available. The correction model 57 may be made up of three equations of the form:

$$Red_{True} = f(Red_{Captured}, Green_{Captured}, Blue_{Captured})$$

$$Green_{True} = g(Red_{Captured}, Green_{Captured}, Blue_{Captured})$$

$$Blue_{True} = h(Red_{Captured}, Green_{Captured}, Blue_{Captured})$$

These equations can be constructed using any standard curve-fitting methodology with the captured and true Red, Green and Blue values of the test colors 18 as input data. The number of data points is determined by the number of captured test colors 18. In order to assure that the color of the ambient light will be accounted for, it is preferred that one of the test colors be white. Once the correction model 57 has been generated, the true target red, green and blue values can be computed by plugging the captured target values into the model equations.

It is also possible to refine the correction model using the overall brightness of the test card image 17. The overall brightness of the test card image 17 can have a significant effect on the relative effects of distortion. The relative brightness of the test card image 17 can be assessed by capturing a previously characterized gray scale 26 in the image along with the captured target color 19 and the captured test colors 18. The effect of the relative brightness on the captured colors 18 can then be factored directly into the model when constructing the correlation equations. Alternatively, the effects can be estimated based on spectrographic data obtained by subjecting the test colors variations in the controlled lighting conditions.

It should be noted that if the overall brightness of the image is too high or too low, there may be insufficient color information to establish a usable correction model. Accordingly, the captured gray scale 15 should be used to determine if the test card image 17 is within allowable brightness limits before any color analysis is attempted.

It will be understood by those having ordinary skill in the art that the described empirical model is only one way of modeling the distortion in the captured image. Other modeling approaches and/or other color descriptors may be used to determine a correction to the captured target color based on the captured appearance of known colors. It will also be understood that the correction model 57 could be refined based on actual knowledge of the ambient lighting conditions.

Figure 2:
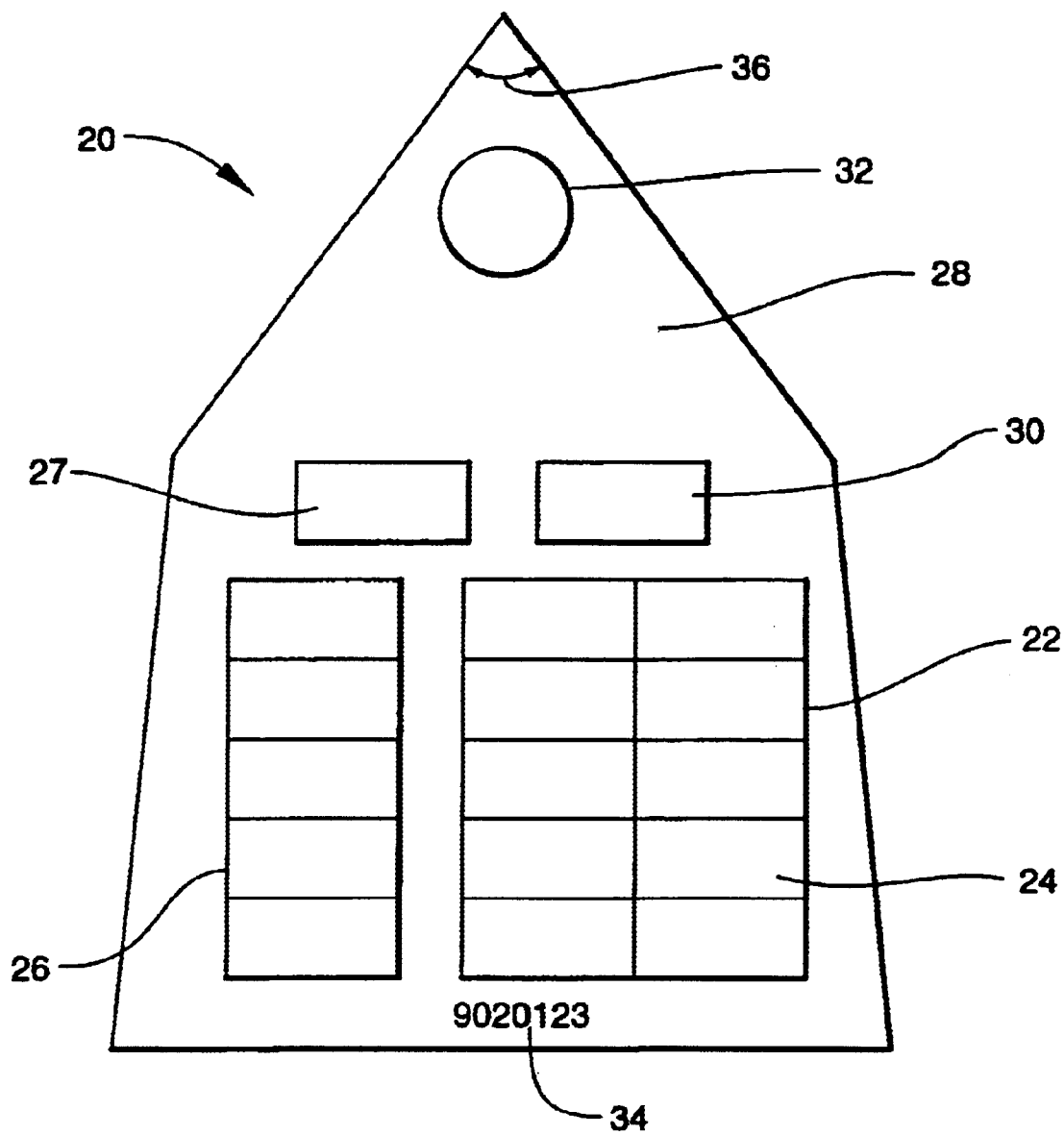
FIG. 2 is a test card for use in practicing a color-matching method of the present invention.

According to the method of the present invention, a digital image capturing device 14 such as a digital camera is used to capture an image 16 that includes a portion of the target surface and a test card 20 with previously characterized colors primed on it. FIG. 2 illustrates a test card 20 that can be used. It will be understood that the illustrated test card 20 is exemplary and that many other test card configurations are possible. The test card 20 includes a color pattern 22 having a pattern of substantially monochromatic color fields 24, a gray scale 26, a white background region 28, a flat black field 27, a gloss black field 30 and an aperture 32. The test card 20 also has an identification code 34 printed thereon. As discussed in more detail hereafter, the test card 20 has a shape intended to facilitate its recognition within an image.

The test card 20 has ten color fields 24, each having a single color printed within its borders. It will be understood that any number of color fields 24 can be used; however, the number of color fields 24 determines the number of data points available for construction of the correction model 57 and therefore has a significant impact on the success of the method. Accordingly, too few color fields 24 will result in a coarse model requiring significant interpolation between widely spaced colors. A large number of color fields 24 would require a large test card and would unnecessarily increase computation time. It has been found that ten colors extending across the visible spectrum are sufficient to produce good matching results.

The color fields 24 must be of sufficient size that the image capturing device 14 can resolve them at a distance of several feet. In addition, the color fields 24 must be of sufficient size on the captured image 16 for the color analysis to be conducted. The analysis software needs only a few pixels from each color field 24. However, in order to minimize the potential for error, the outermost pixels within each analysis region are removed before an average color for the region is computed. For an image 16 captured four feet away from the test card 20, a color field size of about one inch square is likely to be adequate for most digital cameras. The field may be smaller depending on the resolution capability of the image capturing device 14.

The gray scale 26 is used in conjunction with the white background region 28 and the flat black field 27 to establish the overall brightness of a captured image 16. The gray scale 26 includes a series of gray fields 25 varying from dark gray to light gray, each describable by its relative brightness compared to black (0%) and white (100%). The gray and black fields 25, 27 should be sized in a manner similar to the color fields 24. The overall brightness of the image 16 is established based on the average change in brightness of the gray fields 25. As few as one gray field 25 may be used for this determination, but the use of five gray fields 25 can provide greater accuracy. Use of a range of gray values can also provide additional data for use in the light distortion correction model.

The present method is intended to match colors under ambient lighting conditions, but is not intended to account for glare. The color fields 24, the black field 27 and the gray scale 26 should therefore have a flat finish to minimize distortion due to glare. Notwithstanding this precaution, glare may still be present under certain conditions. The gloss black field 30 is used to determine whether glare is present. The gloss black field 30 is printed with a reflective glossy finish that will generally appear black if no significant glare is present but will appear gray if glare is present. Thus, if the brightness level of the captured gloss black field 30 is indicative of gray rather than black, glare has affected the image. If the effect is significant, the analysis should be stopped and the image 16 rejected.

The test card 20 includes an aperture 32 through which the target surface 12 can be seen when the card is placed flat against the target surface 12. The test card 20 should be thin to minimize the potential for a shadow of the aperture edge to be cast on the target surface 12. The aperture 32 may be positioned anywhere on the test card 20. It is preferred, however, that the aperture 32 be positioned near an edge or corner of the test card 20 to facilitate positioning of the aperture 32 over an otherwise inconveniently placed target surface 12. It will be understood by those having ordinary skill in the art that it is not necessary that a portion of the target surface be visible within the boundaries of the test card 20. The method can be used as long as a portion of the target surface 12 appears in the image with the test card 20 and can be located by the analysis software. The use of the aperture 32 merely facilitates the locating of the target surface by the analysis software. This could also be accomplished by using a notch in the perimeter of the test card 30 or by positioning the target surface 12 adjacent a predetermined point on the perimeter of the test card 20.

The software 50 used to analyze the digital image 16 includes an object recognition module 52 for use in identifying the test card image 17 within the digital image 16 and in orienting the test card image 17 so that its individual features may be located. In order to facilitate its recognition, the test card 20 should have a shape that will be readily distinguishable from other objects appearing in the image 16. In addition, the test card 20 should be shaped so that only one orientation is possible relative to the features printed on the test card 20. Accordingly, common shapes such as simple rectangles and triangles and regular, symmetric shapes such as equilateral polygons, circles and ellipses should be avoided. The test card 20 illustrated in FIG. 2 is a pentagonal shape with no orthogonal angles and only one ads of symmetry. The aperture 32 is positioned near an acute perimeter angle 36 to allow positioning over inconvenient target surfaces. Importantly, the shape of this test card 20, once recognized as a match by the object recognition module 52, has only one possible orientation.

The test card 70 may be formed of any material on which a flat finish can be obtained, including paper, plastic or metal. The test card 20 may be either rigid or pliable, but in either instance, should be substantially flat when positioned for image capture. If the test card 20 is to be reusable, it is preferred that it be formed from a durable and easily cleanable material. A releasable adhesive may be applied to the back of the test card 20 to form a sticker.

In order for a correction model 57 to be generated from the test card image 17, the analyst or the analysis software 50 must have access to a set of true color components for each of the color fields 24, for each of the gray fields 25, for the flat black field 27 and for the white background region 28. Ideally, these true color components are based on test data for the specific test card 20 captured in the image 16. This allows the elimination of variations in the color matching results due to variations in test card materials and variations in printing processes and materials. If a large number of test cards 20 are to be produced, however, individual testing of every test card 20 becomes impractical. If the assumption is made that the variations within a particular batch of test cards 20 are small, suitable true color values for all test cards 20 of a given batch can be assigned based on testing of a sample set of cards. The true colors are determined by spectrographic measurement under standard lighting conditions. The precise conditions are not important as long as they art the same conditions as those used to measure true color values for the products that will be used to match the estimated true target color 61. If the effects of overall image brightness are to be incorporated into the correction model 57, it may also be desirable to assess these effects under the same controlled conditions.

In order to assure association of the appropriate true color data with the correct test card 20 or batch of test cards 20, it is preferred that each test card 20 be assigned an identification code. A unique code may be assigned to each test card 20 or to all test cards 20 within a particular batch. Assigning a unique code to each test card 20 has advantages with respect to tracking users and purchases of color-matching services as will be discussed in more detail hereafter. A graphical representation 34 of the code may be printed directly on the test card 20. This graphical representation 34 may be in alphanumeric form or in a machine readable form such as a barcode. The graphical representation 34 allows the digital image analysis software 50 to identify and interpret the code for any test card 20 being analyzed. While this eliminates the necessity of the user entering the test card code when submitting an image for analysis, it requires a higher level of resolution when capturing the image 16.

The digital imaging device 14 is typically a digital camera but may be any device capable of capturing a digital image including but not limited to a scanner or video camera. The resolution of the imaging device 14 need only be sufficient to allow recognition and orientation of the test card image 17 within the digital image 16. Higher resolution is required if the identification code 34 is to be interpreted by the analysis software 50. The imaging device 14 should include at least 16-bit color and preferably 24-bit. When using the imaging device 14 to capture a digital image 16, care must be taken to assure that the entire test card 20 is visible and in focus. Because the method is intended to match colors as they appear under ambient conditions, it is preferred that images be captured without a flash, However, if it is likely that the image 16 will be too dark for analysis, a flash may be used.

The data processing system 40 may be any system capable of receiving digital image data from the imaging device 14 and capable of loading and running the analysis software 50. The system 40 may be made up of a single processor with all input, output and processing functions performed therein. However, the present color-matching method finds its best utility in a system having multiple processors wherein the digital image 16 is downloaded to one processor and transferred to a second processor for analysis. The processors may be hardwired or connected through any network or the Internet.

Figure 3:
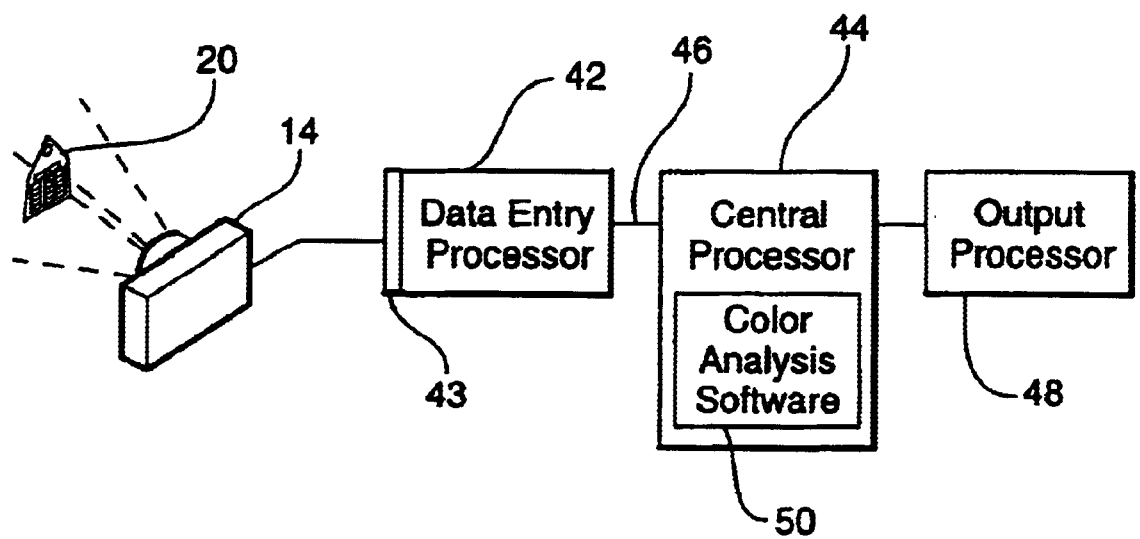
FIG. 3 is a schematic representation of a color-matching system according to one embodiment of the present invention.

FIG. 3 schematically illustrates a color-matching system 10 having a test card 20, a digital imaging device 14 and a data processing system 40 wherein a data entry processor 42 is selectively connected to a central processor 44 via a telephone line 46. The data entry processor 42 includes a data entry port 43 (or other input device such as a diskette drive) for receiving information from the digital imaging device 42. A digital image 16 can be downloaded from the digital imaging device 14 into the data entry processor 42 through the data entry port 43, which then transmits the image to the central processor 44. The central processor 44 uses the color analysis software 50 to analyze the digital image 16 and returns the desired output to the data entry processor 42 in the form of a matching color description, color product, paint formulation or other useful information. Alternatively, the central processor 44 can transmit the output to an output processor 48 connected to the central processor 44 through a network connection 49. The output processor 46 may be remote from either the data entry processor 42 or the central processor 44. The central processor 44 can also generate a hard copy of the output for mailing to a requested address.

Importantly, the data entry processor 42 does not require any specialized software other than the standard software required for receiving and transferring digital images.

As discussed above, the color analysis software 50 includes several modules. Together these modules provide the capability of locating the test card image 17 within the overall digital image 16, locating the various regions on the test card image 17, constructing a correction model 57, applying the correction model to the captured target color 19 to obtain an estimated true target color 61 and comparing the estimated true target color 61 to known true colors to find a match.

Figure 4:
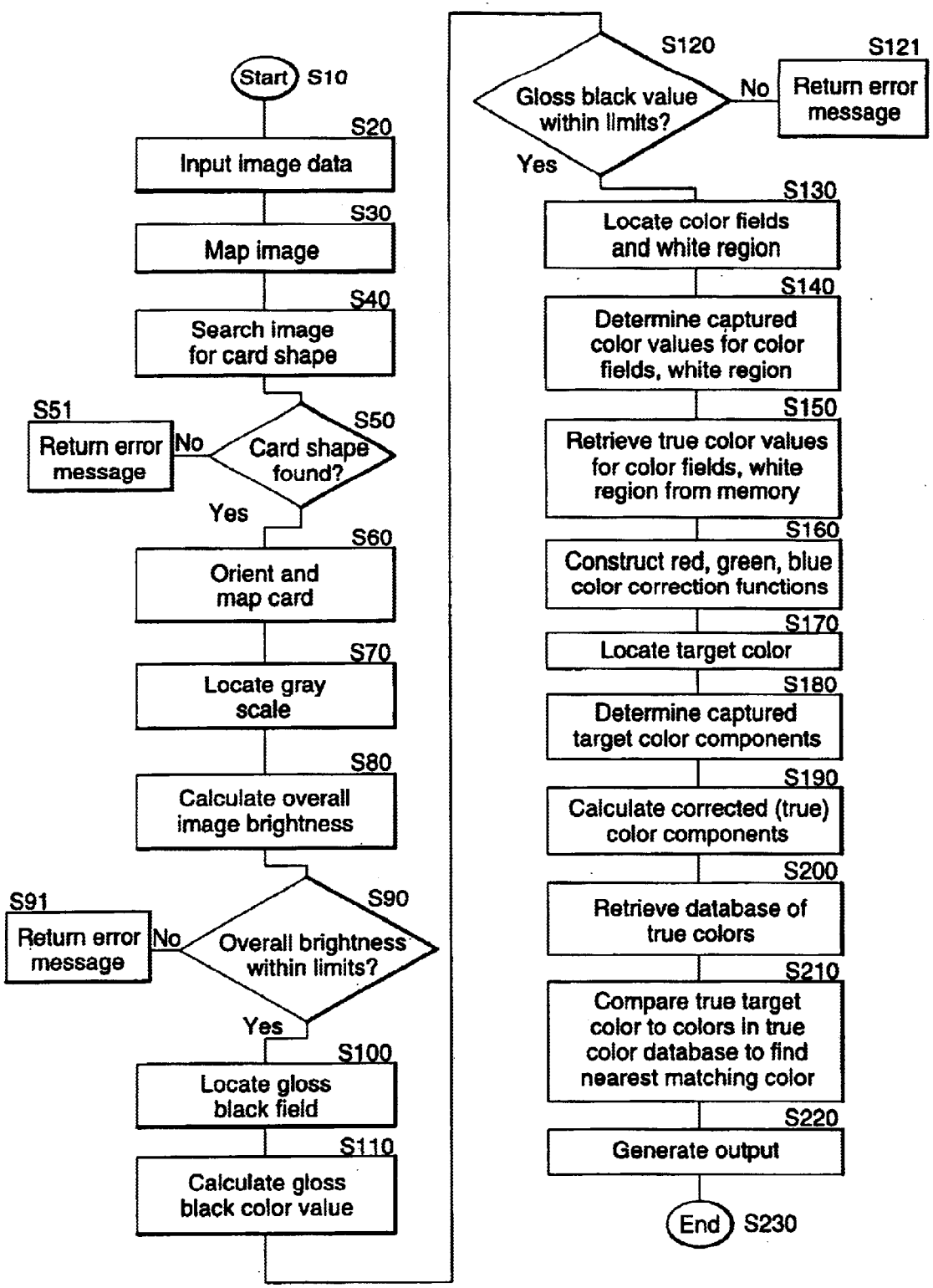
FIG. 4 is a flowchart of an illustrative software set that may be used in practicing a color-matching method of the present invention.

The flowchart shown in FIG. 4 illustrates the flow of an exemplary software package 50 for analyzing a digital image 16 in the manner of the present invention.

Digital image data 16 is input either directly from a digital imaging device 14 or diskette or from a data entry processor 42 at step S20. The brightness data associated with each pixel of the digital image is mapped at step S30. The object recognition module 52 is then used to locate the shape of the test card 20 within the mapped digital image. It will be understood by those having ordinary skill in the art that there is a variety of well-known object recognition software packages available, any of which would be suitable for use in implementing the present method. As discussed above, the test card 20 is configured so that it may be easily distinguished by the object recognition software. If the card shape cannot be found within the digital image 16, an error message S51 is returned and the analysis halted. Failure to find the image of the test card 20 can result from insufficient resolution of the image, blurring of the captured image due to movement of the camera or failure to focus on the test card, failure to capture the entire card within the bounds of the digital image, or insufficient ambient light.

Once the test card image 17 has been located, the object recognition module 52 orients and re-maps the test card image 17 so that data from the various fields of interest on the test card image 17 can be used.

At step S70, the quality check module 54 locates the data associated with the gray fields 25 of the gray scale 26. The quality check module 54 then calculates an overall image brightness at step S80 by comparing the brightness of the captured gray field colors 15 to the known true colors of the gray field 25. If the overall brightness is within a set of predetermined limits, the analysis proceeds. If the overall brightness is either too bright or too dark, an error message S91 is returned and the analysis halted.

At step S100, the quality check module 54 locates the gloss black field 30. A captured gloss black color value is then determined from the brightness data for the gloss black field 30 at step S110. If the captured value of the gloss black field 30 is not within predetermined limits, thereby indicating the presence of glare, an error message S121 is returned and the analysis halted. If the gloss black value indicates that there is no significant glare, the analysis proceeds.

The color analysis module 56 locates the color fields 24 and the white background region 28 at step S130. At step S140, the color analysis module 56 determines captured color values for each of the color fields 24 and for the white background region 28.

In all instances where the software is called upon to determine a brightness or color value within a bounded region of the test card image, the software will discard the information associated with the pixels along the border of the region of interest. Data associated with the remaining pixels within the region are then averaged to provide a single brightness or a single color component for the region. If the color data for the remaining pixels exhibit a variation greater than a predetermined limit, the analysis may be halted.

Accordingly, at step S140, the color analysis module 56 determines a red color component, a green color component and a blue color component for each of the color fields 24 and for the white background region 28. At step S150, the color analysis module 56 retrieves true color component values for each of the color fields 24 from memory. As discussed above, these true color values are obtained through spectrographic measurement of the color fields 24 under standard lighting conditions. As also discussed, the true color values may be specific to the test card 20 being analyzed or may be based on measurements of a sample set from a batch of test cards 20.

Using both captured and true red, green and blue color components for each of the color fields 24 and the white region 28, the color analysis module 56 constructs a correction model 57 comprising red, green and blue color correction functions. These functions can be constructed using any standard curve-fitting software package. If desired, the overall brightness can also be factored into the correction model 57.

At step S170, the target color determination module 60 locates the captured target color 19 based on the known location of the aperture 32 on the test card 20. The captured color components are then determined based on brightness measurements within the field defined by the captured aperture image. The captured target color component values are then entered into the color correction functions to determine the estimated true target color 61.

The color match determination module 62 retrieves a database or portion of a database of true colors associated with a product line of interest at step S200. These true colors are obtained through spectrographic measurement of the product colors under the same controlled conditions as is used to obtain the true test card colors. At step S210, the estimated true target color 61 is compared to colors from this database to determine a nearest matching database color 63. At step S220, the software generates output 64 that may be sent directly to a display or printer or may be transmitted to a remote processor. The output 64 may take any of a variety of forms but will generally include a description, code or formula associated with the nearest matching database color 63. The output 64 may also include information relating to the estimated true target color 61, the correction model 57 or information relating to any of the captured colors.

In some instances, mathematical formulas can be used to translate a set of color components directly into colorant product formulations. If such formulas are available for the products of interest, it is not necessary to compare the estimated true target color 61 to a database of discrete color values. A matching product color can instead be precisely specified using the formulas and the color components of the estimated true target color 61.

An illustrative color matching method according using the color matching system 10 involves obtaining a test card 20 having the features shown in FIG. 2. The test card 20 is positioned so that a portion of the target surface 12 to be matched is visible through the aperture 32 of the test card 20. This portion of the surface is the target and the color of this portion is the target color. The target location should be selected as representative of the color of the overall target surface 12. Only a single color should be visible through the aperture 32. A digital camera or other imaging device 14 is then used to capture a digital image 16 of the test card 20 and the target. The image should be taken so that the test card 20 is in focus and as large as possible in the resulting image 16.

The user then downloads the digital image 16 from the imaging device 14 to a data entry processor 42 and transmits it to a central processor 44. (As previously discussed, the processing system may be a single integral system as well.) If the color matching system 10 is not configured to read the graphical identification code 34, the test card identification code must be entered by the user. The user may also be required to provide personal information at the time of transmission of the digital image 16. Upon receipt, the central processor 44 applies the analysis software 50 to the digital image 16. The analysis software 50 maps the digital image 16, locates the test card image 17 within the digital image 16, orients the test card image 17 and re-maps the test card image 17, If required, the software 50 then locates and interprets the graphical identification code 34. The software 50 then locates the captured gray scale 15 and uses it to determine the overall brightness of the test card image 17. If the brightness is outside a predetermined range, the analysis is terminated and an error message returned to the user. The software 50 then uses the gloss black field 30 to determine whether too much glare is present. If so, the analysis is terminated and an error message is returned to the user. If not, the software 50 proceeds to construct a correction model 57 from captured and true data associated with the color fields 24 and the white background region 28. The correction model 57 is then applied to the red, green and blue components of the captured target color 19 to obtain an estimated true target color 61 The estimated true target color is then compared with a true product color database to determine the nearest matching product color 63. Information regarding the match is then provided to the user.

This method and the color-matching system 10 are highly advantageous in that they identify for the user a color product that will match the target color in the lighting environment of most significance: the environment where the product will be used. Moreover, the user of the system does not need to purchase specialized equipment or software. The data entry processor 42 can be an ordinary personal computer having the capability of receiving and transmitting digital images. The data entry processor 42 can be located in the user's home where the user can download the digital image 16 and transmit it to the central processor 44 by electronic mail. This is particularly advantageous for marketing of a color-matching service through a web page on the Internet.

In an alternative approach, the data entry processor 42 can be located at a retail outlet such as a hardware store. In such a case, a prospective paint buyer interested in matching a particular color can use his own digital camera to capture the digital image 16 of the test card 20, then take the camera or a diskette to the hardware store for downloading to the data entry processor 42. Output from the central processor 44 would be available almost immediately to assist the buyer in selecting a paint color. Ideally, a prospective buyer would be able to obtain the test card 20 at the same location.

A color-matching method according to the present invention can be marketed to potential users as a service either through retail outlets or through a web page on the Internet. In one embodiment of the method, a user can purchase or otherwise obtain a test card 20. After obtaining the test card 20, the user proceeds through the steps of the method in much the same fashion as discussed above. In this embodiment, however, the software 50 will not proceed with the test card analysis steps unless it determines that payment for the service has been received. Payment can be made in a number of ways including payment at the time the test card is purchased, payment at the time of initiation of the service or payment over the phone at any time after the test card 20 has been purchased. Whenever a payment is made, the user is granted a certain number of uses of the service. If each test card has a unique identification number, the number of purchased service uses may be tracked by association with the identification number on the user's test card 20. The number of available uses for a particular test card 20 can be stored for retrieval by the central processor 44. Each time a service purchase is made, the number of available uses is increased. The software 50 would include a step wherein the number of available uses associated with the test card 20 is checked prior to running an analysis of the test card 20. If the number of available uses is zero, the central processor 44 returns an error message and/or offers the opportunity for the user to purchase additional uses. If the number of available uses is greater than zero, the software 50 proceeds with the analysis of the image 16. Each time the test card 20 is used in an image 16 processed by the central processor 44, the number of available uses is reduced by one.

As an alternative to tracking the number of available uses by the identification of the test card 20, the number of uses could be stored in conjunction with user identification information. This would require that the user input certain personal information or a password at the time of submitting an image 16 for analysis.

The present invention provides an accurate, widely applicable, system and methodology for matching the color of a target surface under normal ambient lighting conditions. The methodology is highly flexible and lends itself to a wide variety of convenient marketing approaches.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a fill and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for matching a color of a target surface comprising the steps of:
    providing a test card having a pattern of at least one color field printed thereon, each of the at least one color field being monochromatic and having a true color;
    positioning the test card adjacent the target surface;
    producing a digital record that includes a digital image of the test card and at least a portion of the target surface exhibiting the target surface color, the target surface color producing a captured target color on the digital image and each of the at least one color field producing a captured pattern color on the digital image;
    determining an estimated true target color using the captured pattern color and the true color of each of the at least one color field;
    providing a database of product color information; and
    determining a nearest matching product color using the estimated true target color and the database of product color information.

2. A method for matching a color of a target surface according to claim 1 wherein the step of determining an estimated true target color includes:
    determining a set of captured pattern color components for the captured pattern color of each of the at least one color field;
    building a correction model having a set of empirical equations derived from the true color and the set of captured pattern color components of each of the at least one color field;
    determining a set of captured target color components for the captured target color; and
    applying the correction model to the captured target color components to obtain the estimated true target color.

3. A method for matching a color of a target surface according to claim 2 wherein the step of determining an estimated true target color further includes:
    determining the location and orientation within the digital record of the digital image of the test card and the at least a portion of the target surface exhibiting the target surface color; and
    locating within the digital image the captured pattern color of each of the at least one color field and the captured target color.

4. A method for matching a color of a target surface according to claim 3 further including the step of loading the digital record into a data processing system and wherein the step of determining an estimated true target color is accomplished by the data processing system.

5. A method for matching a color of a target surface according to claim 4 wherein the data processing system includes a central data processor operatively connected to a data entry processor and the step of loading the digital record into the data processing system includes:
    loading the digital record into the data entry processor; and
    transferring the digital record to the central data processor.

6. A method for matching a color of a target surface according to claim 5 wherein the central data processor and the data entry processor are connected through a network.

7. A method for matching a color of a target surface according to claim 5 wherein the central data processor and the data entry processor are connected through the Internet.

8. A method for matching a color of a target surface according to claim 4 wherein the test card includes an identification code printed thereon, the method further comprising the steps of:
    obtaining spectral data for each of the at least one color field of the test card under lighting conditions configured to establish the true color of the at least one color field;
    deriving a set of true color components of the at least one color field from the spectral data; and
    storing the set of true color components in association with the identification code of the test card, whereby the set of true color components may be selectively retrieved.

9. A method for matching a color of a target surface according to claim 8 wherein the step of determining an estimated true target color includes:
    retrieving the set of true color components of each of the at least one color field for use in constructing the correction model.

10. A method for matching a color of a target surface according to claim 4 wherein the test card is one of a batch of test cards and the test card includes an identification code printed thereon, the method further comprising the steps of:

obtaining from a sample subset of the batch of test cards spectral data for each of the at least one color field of the test card under lighting conditions configured to establish the true color of the at least one color field;

deriving a representative set of true color components of each of the at least one color field for the test card from the spectral data of the at least one color field of each of the sample subset of the batch of test cards; and storing the representative set of true color components in association with the identification code of the test card, whereby the representative set of true color components may be selectively retrieved.

11. A method for matching a color of a target surface according to claim 10 wherein the step of determining an estimated true target color includes:

retrieving the representative set of true color components of each of the at least one color field for use in constructing the correction model.

12. A method for matching a color of a target surface according to claim 1 wherein the test card includes a gray scale having at least one gray field, each of the at least one of gray field having a known relative brightness, and wherein each of the at least one gray field produces an associated captured gray field on the digital image of the test card and the at least a portion of the target surface, the method further comprising the steps of:

determining an overall brightness of the digital image from the known relative brightness and the captured brightness for each captured gray field; and determining whether the overall brightness is within a set of predetermined brightness limits.

13. A method for matching a color of a target surface according to claim 1 wherein the test card includes a gloss black field that produces an associated captured gloss black field on the digital image of the test card and the at least a portion of the target surface, the method further comprising the steps of:

determining a gloss black brightness level for the captured gloss black color field;

determining a glare level based on the gloss black brightness level; and determining whether the glare level is within a set of predetermined glare limits.

14. A method for matching a color of a target surface according to claim 1 wherein the database of product color information includes a compilation of true product colors and the step of determining a nearest matching product color includes:

comparing the estimated true target color to at least a portion of the compilation of true product colors; and selecting the nearest matching product color from the at least a portion of the true product colors.

15. A method for matching a color of a target surface according to claim 1 wherein the database of product color information includes a product color formula whereby a formulation for a colorant product can be determined for a given true color and the step of determining a nearest matching product color includes:

calculating a target color colorant formulation using the product color formula and using the estimated true target color as the given true color, the target color colorant formulation being usable to provide the nearest matching product color.

16. A method for matching a color of a target surface comprising the steps of:

providing a test card having a pattern of at least one color field printed thereon, each of the at least one color field being monochromatic and having a true color;

positioning the test card adjacent the target surface;

producing a digital record that includes a digital image of the test card and at least a portion of the target surface exhibiting the target surface color, the target surface color producing a captured target color on the digital image and each of the at least one color field producing a captured pattern color on the digital image;

providing a data processing system including a user processor operatively connected to a central processor, the central processor having analysis software for analyzing the digital record;

downloading the digital record into the user processor;

transferring the digital record to the central processor;

determining an estimated true target color using the central processor and the analysis software;

comparing the estimated true target color with known true product colors to identify products whose true color matches the estimated true target color within a predetermined set of matching criteria;

transmitting information relating to matching color products to the user processor; and outputting the information relating to matching color products.

17. A method for matching a color of a target surface according to claim 16 wherein the step of determining an estimated true target color includes:

determining the location and orientation within the digital record of the digital image of the test card and the at least a portion of the target surface exhibiting the target surface color; and locating within the digital image the captured pattern color of each of the at least one color field and the captured target color;

determining a set of captured pattern color components for the captured pattern color of each of the at least one color field;

building a correction model having a set of empirical equations derived from the true color and the set of captured pattern color components of each of the at least one color field;

determining a set of captured target color components for the captured target color; and applying the correction model to the captured target color components to obtain the estimated true target color.

18. A method for matching a color of a target surface according to claim 17 wherein the test card includes an identification code printed thereon, the method further comprising the steps of:

obtaining spectral data for each of the at least one color field of the test card under lighting conditions configured to establish the true color of the at least one color field;

deriving a set of true color components of the at least one color field from the spectral data; and storing the set of true color components in association with the identification code of the test card, whereby the set of true color components may be selectively retrieved.

19. A method for matching a color of a target surface according to claim 18 wherein the step of determining an estimated true target color includes:

retrieving the set of true color components of each of the at least one color field for use in constructing the correction model.

20. A method for matching a color of a target surface according to claim 17 wherein the test card is one of a batch of test cards and the test card includes an identification code printed thereon, the method further comprising the steps of:

obtaining from a sample subset of the batch of test cards spectral data for each of the at least one color field of the test card under lighting conditions configured to establish the true color of the at least one color field;

deriving a representative set of true color components of each of the at least one color field for the test card from the spectral data of the at least one color field of each of the sample subset of the batch of test cards; and storing the representative set of true color components in association with the identification code of the test card, whereby the representative set of true color components may be selectively retrieved.

21. A method for matching a color of a target surface according to claim 20 wherein the step of determining an estimated true target color includes:

retrieving the representative set of true color components of each of the at least one color field for use in constructing the correction model.

22. A method for matching a color of a target surface according to claim 16 wherein the steps of determining an estimated true target color, comparing the estimated true target color, transmitting information and outputting the information are provided as a service to a user who has purchased the test card, wherein the purchase of the test card entitles the user to a predetermined number of uses of the service.

23. A method for matching a color of a target surface according to claim 22 further comprising the steps of:

determining a number of authorized service uses associated with the test card; and terminating the service and returning an error message to the user processor if the number of authorized service uses is not greater than zero.

24. A system for matching a color of a target surface using a digital imaging device, the system comprising:

a thin, generally planar test card for placement adjacent the target surface, the test card having an upper surface with a pattern of at least one color field printed thereon, each of the at least one color field being monochromatic and having a true color, the test card being configured so that a digital record of the test card and at least a portion of the target surface exhibiting the target surface color may be obtained using the digital imaging device, the digital record including a digital image of the test card and the target surface color, the target surface color producing a captured target color on the digital image and each of the at least one color field producing a captured pattern color on the digital image;

a data processing system having means for receiving the digital record;

software installed in the data processing system and configured for analysis of the digital record and determination of an estimated true target color by application of a correction model to the captured target color, the correction model being determinable from the true color and the captured pattern color of each of the at least one color field;

and a color product database accessible by the data processing system, the color product database including information from which a nearest matching product color to the estimated true target color may be determined.

25. A system for matching a target color according to claim 24 wherein the data processing system includes a data entry processor operatively connected to a central processor, the software and the color product database being installed in the central processor.

26. A system for matching a target color according to claim 25 wherein the data entry processor and the central processor are connected through a network.

27. A system for matching a target color according to claim 25 wherein the data entry processor and the central processor are connected through the Internet.

28. A system for matching a target color according to claim 24 wherein the test card includes an identification code printed thereon.

29. A system for matching a target color according to claim 28 wherein the test card is one of a plurality of test cards, each having a unique identification code and wherein the system further comprises a database of true color components of the at least one color field for each of the plurality of test cards, the database of true color components being searchable by the identification code, whereby the true color components of the at least one color field of a selected one of the plurality of test cards is accessible to the software.

30. A system for matching a color of a target surface according to claim 24 wherein the test card has an aperture formed therethrough whereby the target surface color may be made visible through the aperture when the test card is placed adjacent the target surface.

31. A system for matching a color of a target surface according to claim 24 wherein a gray scale is printed on the upper surface of the test card, the gray scale including at least one gray field, each of the at least one gray field having a different relative brightness value, the gray scale being configured to produce in the digital image a corresponding captured gray scale from which an overall brightness of the digital image can be ascertained.

32. A system for matching a color of a target surface according to claim 24 wherein a gloss black field is printed on the upper surface of the test card, the gloss black field being configured to produce in the digital image a corresponding captured gloss black field from which a relative glare amount can be ascertained for the digital image.

33. A color test card for use in a system for matching a color of a target surface using a digital imaging device, the color test card comprising:

a thin, generally planar card member having an upper surface and a lower surface;

a pattern of at least one color field printed on the upper surface of the card member, each of the at least one color field being monochromatic and having a true color;

an identification code printed on at least one of the upper and lower surfaces;

a gray scale printed on the upper surface of the test card, the gray scale including at least one gray field, each of the at least one gray field having a different relative brightness value; and a gloss black field printed on the upper surface of the test card;

wherein the test card is configured so that a digital record of the test card and at least a portion of the target surface exhibiting the target surface color may be obtained using the digital imaging device, the digital record including a digital image of the test card and the target surface color, the target surface color producing a captured target color on the digital image and each of the at least one color field producing a captured pattern color on the digital image.

34. A color test card according to claim 33 wherein the generally planar card member has a predetermined shape configured to facilitate automated location of the digital image of the test card and the target surface color in the digital record using object recognition software.

35. A color test card according to claim 33 wherein the generally planar card member has an aperture formed therethrough whereby the target surface color may be made visible through the aperture when the test card is placed adjacent the target surface.

* * * * *